Sept. 18, 1951     L. A. McDONALD     2,568,245

FISHING REEL

Filed Sept. 20, 1947     2 Sheets-Sheet 1

INVENTOR
LEE A. MC DONALD
BY
Edward Reed
ATTORNEY

Sept. 18, 1951 L. A. McDONALD 2,568,245
FISHING REEL
Filed Sept. 20, 1947 2 Sheets-Sheet 2
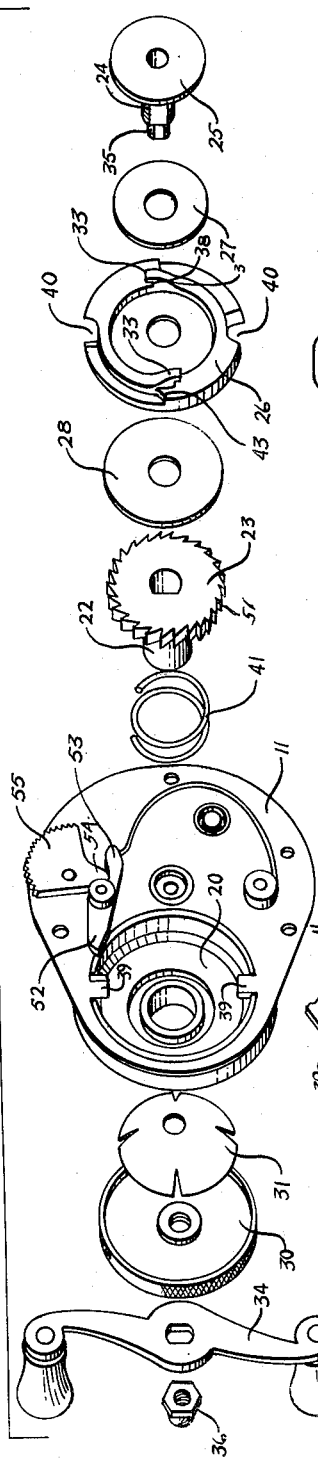
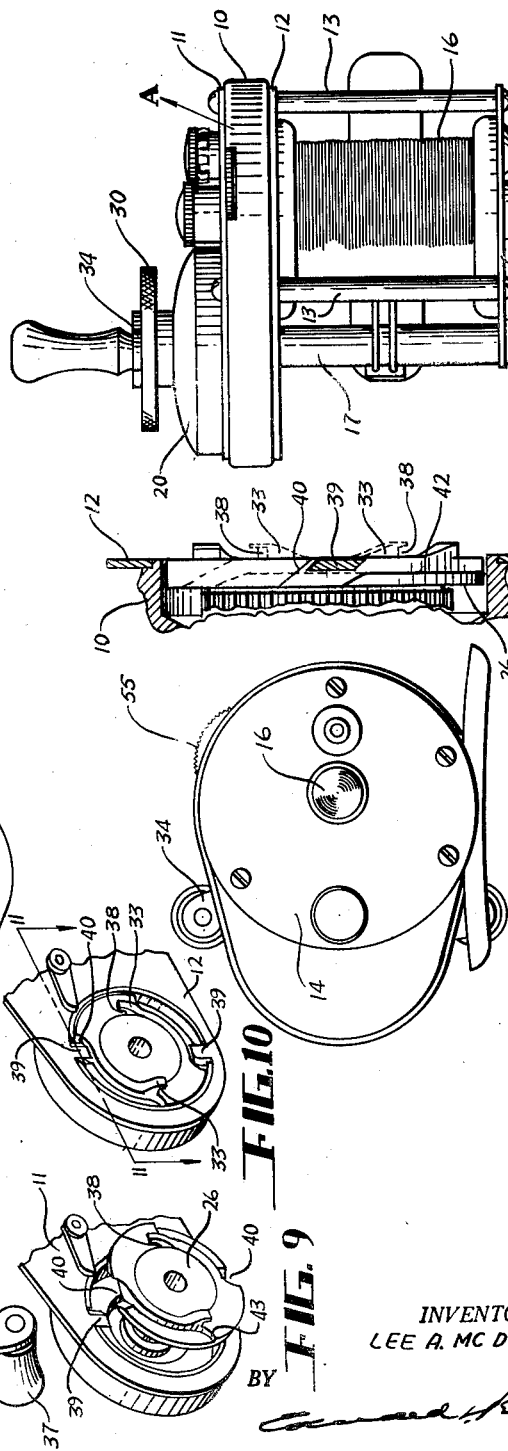
INVENTOR.
LEE A. MC DONALD
BY
ATTORNEY Patented Sept. 18, 1951

2,568,245

UNITED STATES PATENT OFFICE 2,568,245

FISHING REEL

Lee A. McDonald, Middletown, Ohio

Application September 20, 1947, Serial No. 775,263

7 Claims. (Cl. 242—84.5)

This invention relates to a fishing reel, and one object of the invention is to provide a reel of simple but strong construction which can be advantageously used for various types of fishing and which can be produced at a relatively low cost.

A further object of the invention is to provide such a reel in which the spool driving element is separate from the driving shaft and may be connected with or disconnected from the shaft by the maipulation of the latter without shifting gears.

A further object of the invention is to provide such a reel in which the driving shaft is automatically connected with the spool driving element when the shaft is rotated in a forward or line winding direction.

A further object of the invention is to provide such a reel in which the driving shaft may be disconnected from the spool driving element and locked in an inoperative position by an outward pull on the shaft and a simultaneous rotation thereof in a reverse direction.

A further object of the invention is to provide such a reel in which a friction clutch of the disk type is interposed between the driving shaft and the spool driving element, and having improved means for exerting a resilient pressure in opposite directions on two opposed disks of said clutch, including means for effecting very fine adjustments of said pressure.

Other objects of the invention may appear as the reel is described in detail.

Figure 1:
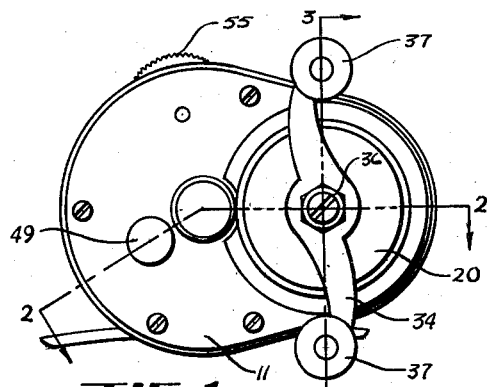
Figure 5:
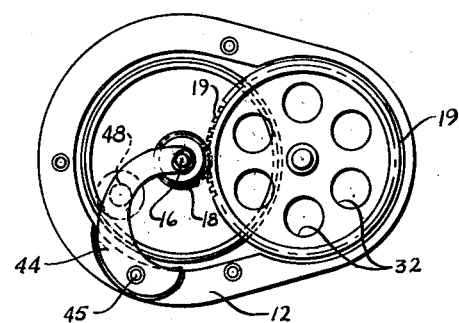
Figure 2:
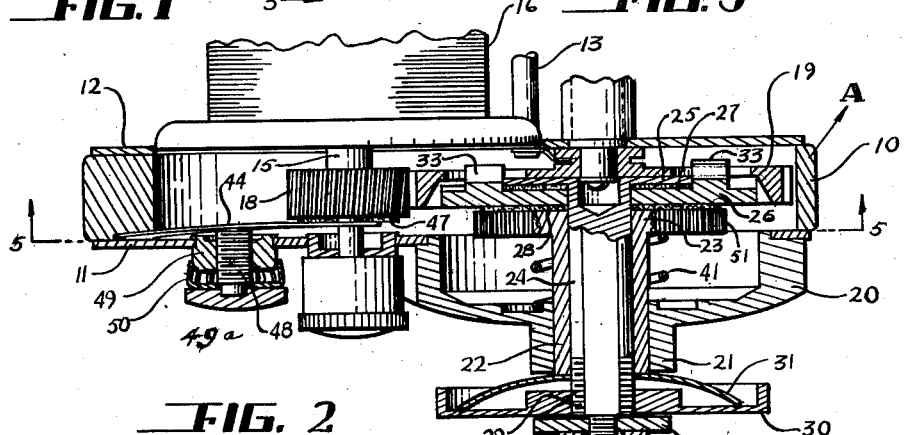
Figures 3, 4:
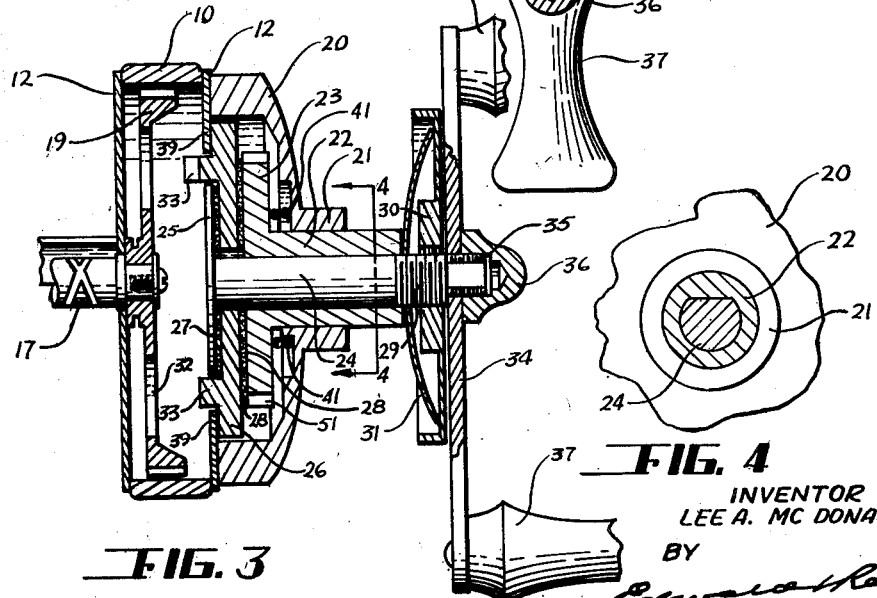

In the accompanying drawings Fig. 1 is a front elevation of a reel embodying the invention; Fig. 2 is a section taken on the line 2—2 of Fig. 1; Fig. 3 is a section taken on the line 3—3 of Fig. 1; Fig. 4 is a section taken on the line 4—4 of Fig. 3; Fig. 5 is a section taken on the line 5—5 of Fig. 2; with the driving shaft retracted as shown in Fig. 3; Fig. 6 is a rear elevation of the reel; Fig. 7 is a top plan view of the reel; Fig. 8 is a perspective view of the front wall of the housing and the several parts carried by the driving shaft in separated relation; Fig. 9 is a perspective view of the locking device showing the same in non-locking position; Fig. 10 is a perspective view of the locking device showing the same as it moves into locking relation to the fixed lugs; and Fig. 11 is a section taken on the line 11—11 of Fig. 10.

In these drawings I have illustrated a preferred embodiment of my invention but it is to be understood that the reel as a whole as well as the several parts thereof may take various forms without departing from the spirit of the invention.

In the illustrated construction the several parts of the mechanism are mounted on a main frame comprising a housing A which includes a circumferential wall 10, a front wall 11 and a rear wall 12. A plurality of studs 13 mounted on the housing support an outer end wall 14. Rotatably mounted in the housing and end wall 14 is a spool shaft 15 on which is mounted the spool 16. Also rotatably supported on the housing and end wall 14 is a level winding line guide 17. The spool shaft is provided with means, such as a pinion 18 by which it may be connected with a driving element which is rotatably mounted in the housing and has continuous driving connection with the spool. Preferably the spool driving element is a gear 19 rotatably mounted within and on the rear wall 12 of the housing and held against axial movement with relation to the housing. In the present instance the gear is mounted on the inner end of the line guide shaft 17 to rotate the same in timed relation with the rotation of the spool.

The housing A is provided with an enlargement which is here shown as a cup shaped member 20 rigidly secured to the front wall 11 of the housing in line with an opening therein, and which has a bearing 21 in axial alinement with the gear 19. A sleeve 22 is mounted in the bearing 21 for both axial and rotary movements with relation to the frame and is provided at its inner end with a disk 23, which is preferably formed integral with the sleeve. A shaft 24 is mounted in the sleeve for axial and rotary movements therewith and for axial movement with relation thereto. Preferably the sleeve and the shaft are provided with complementary non-circular bearing surfaces to prevent the relative rotation thereof while permitting axial movement thereof. Rigidly secured to the inner end of the shaft 24 is a plate or disk 25 and rotatably mounted on the shaft 24 between the disks 23 and 25 is a member 26, preferably circular in contour, and which is frictionally connected with the shaft. In the arrangement shown the disks 23, 25 and 26 constitute parts of a friction clutch, a friction element 27 being interposed between the disks 25 and 26 and a friction element 28 being interposed between the disks 26 and 23.

Suitable spring means are provided for maintaining the clutch disks in frictional contact one with the other and for regulating said frictional contact. In the construction shown the shaft 24 extends outwardly beyond the sleeve 22 and is provided with a screw threaded portion 29 on which is threaded a manually operable device, such as a hand wheel, 30. Interposed between the hand wheel 30 and the end of the sleeve 22 is a concavo-convex spring 31 which is provided with a central aperture to enable it to be mounted about the shaft with its convex side in engagement with the end of the sleeve and with its peripheral edge in engagement with the inner side of the hand wheel 30. The spring, when under tension, tends to move the shaft 24 and disk 25 outwardly and to move the sleeve 22 inwardly, thus moving the disks 23 and 25 in opposite directions and causing them to grip the disk 26 between them. The pressure on the disks is regulated by rotating the hand wheel 30 on the threaded end of the shaft 24 so as to increase or decrease the tension of the spring 31, the spring being preferably provided in its outer portion with a plurality of radial slits to increase its flexibility.

The disk 26 constitutes a connecting member by which the shaft 24 may be connected with the gear 19 to rotate the latter. In the present arrangement the gear 19 has therethrough an annular series of openings 32 and the disk 26 is provided with a pair of lugs 33 projecting from the inner face thereof on opposite sides of the axis of the disk and adapted to be moved into the corresponding openings 32 by the axial movement of the shaft 24 and to be rotated by the shaft into driving engagement with the edge walls of the respective openings. The shaft is provided with suitable means for rotating the same such as a handle comprising a cross bar 34 mounted on the reduced outer end portion 35 of the shaft and secured thereto by a nut 36 which is threaded onto the end portion 35 of the shaft, the bar 34 being provided adjacent each end thereof with a hand grip 37. Inward pressure on the handle 34 will impart axial movement to the shaft and to the clutch elements thereon to move the lugs 33 into openings in the gear 19 and the rotation handle in line winding direction will rotate the lugs into contact with the body of the gear and then rotate the gear and the spool. Preferably the lugs 33 are provided with recesses 38 to receive portions of the body of the gear at the edges of the openings and thus avoid the possibility of the connecting element being inadvertently separated from the gear. Likewise the shaft and connecting member may be separated from the gear by imparting a slight reverse or rearward movement to the shaft and then exerting an outward pull thereon.

While it is entirely practical to control the movements of the connecting member or disk 26 through the handle 34, I prefer to provide means for locking the shaft and connecting member in their retracted and inoperative positions and for automatically releasing the same for movement to an operative position when said movement is imparted to said shaft. For this purpose the front wall 11 of the housing is provided with inwardly extending lugs 39 and the disk or connecting member 26 is provided within its peripheral edge with notches 40 to permit the disk 26 to move through the end wall when the notches are in line with the lugs 39. There may be any suitable number of lugs and notches but in the present instance there are two notches and two lugs, on opposite sides of the shaft. A spring 41 confined between the disk 23 and the end wall of the enlargement 20 of the housing urges the shaft unit inwardly toward the gear 19 to connecting position, as shown in Fig. 2. When the shaft is to be disconnected from the gear a slight rearward movement is imparted to the shaft, by the handle 34, to release the connecting lugs 33 from the gear, and an outward pull is exerted on the shaft to move the shaft unit outwardly and the rearward rotation of the shaft is continued to aline the notches 40 with the lugs 39 on the frame and thus permit the disk 26 to pass the lugs 39. Preferably the notches extend obliquely to the plane of the disk to facilitate the movement of the disk past the lugs during the continued rotary movement of the disk. This continued rotary movement in a rearward direction moves flat surfaced portions 42 of the disk into line with the respective lugs 39 and locks the disk and shaft against inward movement by the spring 41. A stop 43 engages one of the lugs 39 and thus interrupts the movement of the disk with the latter in locking engagement with the lugs. With the connecting member or disk in its retracted position the gear 19 and spool 16 are free to rotate as required for free spool operations, such as casting. When it is desired to again connect the shaft with the gear all that is necessary is to move the handle 34 in forward or winding direction thus moving the notches in the connecting disk into line with the lugs and releasing the disk for movement past the lugs 39 and into connecting engagement with the gear, by the expansion of the spring 41, the continued movement of the handle and shaft moving the recessed edges of the lugs 33 into engagement with the edge walls of the openings in the gear.

When the shaft is thus connected with the gear the spool is held normally against rotation with relation to the shaft and the taking in and paying out of the line is controlled by the fisherman through the handle 34 but the frictional connection between the gear and the shaft protects the line against sudden shocks which might otherwise break the same. For example, if a large fish strikes the lure or the hook catches on a snag the clutch will yield and permit the line to pay out sufficiently to protect it. The extent to which the clutch will allow the line to pay out is regulated by the adjustment of the spring 31. To avoid the necessity of the fisherman constantly exercising this control over the line, the clutch disk 23 may be locked against rotation in a direction to permit the paying out of the line as by a pawl and ratchet connection between the sleeve 22 and a fixed part of the frame. In the present arrangement the disk 23 is provided with ratchet teeth 51 and a pawl 52 (Fig. 8) pivotally mounted on the frame engages the teeth 51. Means are provided for moving the pawl to and retaining the same in an inoperative position when its use is not desired. As here shown the pawl has a tail 53 arranged to be engaged by a cam or trip arm 54 pivotally mounted on the end wall 12 of the housing and having means whereby it may be operated from the exterior of the housing. Preferably, the cam forms a part of a knurled disk mounted on the wall of the housing and projecting a short distance beyond the periphery thereof.

When the spool is free and the reel is to be used in casting, it is desirable that the rotation of the spool during the movement of the lure or plug through the air, and when it strikes the water, shall be so controlled as to prevent the overruning of the spool, which results in the unwinding of more line than is desired and in the line frequently becoming tangled. For this purpose I employ a relatively long flat spring mounted on the frame and arranged to act on the end of the spool pinion 18 see (Figs. 2 and 5). As here shown the spring 44 is arcuate in form and is rigidly secured adjacent one end thereof to the front wall 11 of the housing A, as shown at 45, and extends inwardly into overlapping relation to one end of the pinion. Preferably the inner end of the spring extends across the axis of the pinion and is provided with an opening 46 to receive the reduced end portion of the spool shaft 16 and thus permit the end of the spring to act on the pinion on all sides of its axis. The pinion is provided with a frictional end surface for engagement with the spring and this surface is here shown as a friction disk 47 secured to the pinion. The pressure of the spring on the friction surface may be regulated to vary the resistance offered to the rotation of the pinion and spool. In the present arrangement a screw 48 is mounted in a boss 49 in the wall 11 and extends into the housing and engages the spring approximately midway between the pinion and the point at which the spring is connected with the frame. The screw is provided at its outer end with a knob 49a by which it may be rotated and a cup shaped element 50 is secured to the inner side of the knob and provided with spring fingers which firmly grip the cylindrical boss 49 and thus prevent the accidental movement of the knob after the screw has been set to cause the spring to provide the desired resistance to the rotation of the spool. Obviously the screw may be so adjusted as to permit the spring to move entirely out of engagement with the pinion when it is desired that the spool shall have unrestricted movement, or to cause the spring to exert any desired pressure on the pinion. The pressure of the spring on the pinion being in an axial direction does not increase the pressure of the spool shaft on its bearing and does not in any way affect the centering of the shaft.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a fishing reel, a frame, a spool rotatably mounted on said frame, a pinion drivingly connected with said spool, a gear rotatably mounted on said frame and in constant mesh with said pinion, a shaft mounted on said frame in axial alinement with said gear for both rotary movement and axial movement, a connecting element carried by said shaft and movable thereby into and out of driving engagement with said gear, a spring acting on said shaft to urge said connecting element toward said gear, a handle on said shaft to rotate the same and to retract said shaft axially against the action of said spring, and a part carried by said frame and arranged to have locking engagement with said connecting element when the latter is in its retracted position and to release said connecting element for movement to gear engaging position by said spring when said shaft is rotated in a predetermined direction.

2. In a fishing reel, a frame, a spool rotatably mounted on said frame, a pinion drivingly connected with said spool, a gear rotatably mounted on said frame and in constant mesh with said pinion, a shaft mounted on said frame in axial alinement with said gear for both rotary movement and axial movement, a member connected with said shaft for rotary and axial movement therewith, said gear and said member having parts arranged to be brought into interengaging positions by the movement of said member, spring means urging said member towards said gear, a handle on said shaft to rotate and retract the same, said member and said frame having parts arranged to be brought into interlocking positions by the rotation of said member in one direction and to be brought into releasing positions by the rotation of said member in the other direction.

3. In a fishing reel, a frame, a spool rotatably mounted on said frame, a pinion drivingly connected with said spool, a gear rotatably mounted on said frame and in constant mesh with said pinion, said gear having an opening spaced from the axis thereof, a shaft mounted on said frame in axial alinement with said gear for both rotary and axial movement, a disk secured to said shaft for movement therewith and having a part to enter said opening in said gear and drivingly connect the latter with said shaft, spring means urging said disk towards said gear, a lug carried by and extending inwardly from said frame, said disk having a peripheral notch to permit it to pass said lug, and a handle secured to said shaft, whereby said disk may be moved axially against the action of said spring and beyond said lug and then rotated to move said notch out of line with said lug to lock said disk in its retracted position and the rotation of said disk in the other direction will move said notch into line with said lug and release said disk for movement by said spring means.

4. In a fishing reel, a frame, a spool rotatably mounted on said frame, a pinion drivingly connected with said spool, a gear rotatably mounted on said frame and in constant mesh with said pinion, a shaft mounted on said frame in axial alinement with said gear for both rotary and axial movements, a disk mounted on said shaft for movement therewith and having a part movable into and out of driving engagement with said gear by the movements of said shaft, spring means urging said disk towards said gear, inwardly extending lugs carried by said frame and spaced apart circumferentially of said disk, said disk having peripheral notches to register simultaneously with the respective lugs, said notches being oblique to the plane of said disk to facilitate the movement of said disk past said lugs during the rotation of said disk, a handle on said shaft to impart both rotary and axial movements to said disk, whereby the simultaneous application of outward axial force and reverse rotative force to said disk will move the latter against the action of said spring means past said lugs and into locking engagement with said lugs, and the application of forward rotative force to said disk will move said notches into line with said lugs and said spring means will move said disk past said lugs into engagement with said gear.

5. In a fishing reel, a frame, a spool rotatably mounted on said frame, a pinion drivingly connected with said spool, a gear rotatably mounted on said frame and in constant mesh with said pinion, a shaft mounted on said frame in axial alinement with said gear for both rotary movement and axial movement, a disk secured to the inner end of said shaft, a second disk rotatable on said shaft, extending radially beyond the first mentioned disk and having means for detachably connecting the same with said gear, a friction element between said disks, a sleeve slidably supported on said shaft and held against rotation thereon, a third disk rigid with said sleeve, a friction element between said second and third disks, said shaft having a screw threaded portion beyond the outer end of said sleeve, a member threaded on the threaded portion of said shaft, a spring interposed between said member and said sleeve and tending to move said first and third disks one toward the other, and a handle secured to said shaft outwardly beyond said member to impart both rotary and axial movements to said shaft.

6. In a fishing reel, a frame, a spool driving member rotatably mounted on said frame and held against axial movement with relation thereto, a shaft mounted on said frame in axial alinement with said driving member for both rotary movement and axial movement, a disk rigid with the inner end of said shaft, a second disk rotatably mounted on said shaft, extending radially beyond the first mentioned disk and having means controlled by the movement of said shaft for drivingly connecting the same with and disconnecting the same from said driving member, a friction element between said disks, a sleeve slidably mounted on said shaft and held against rotation with relation thereto, a third disk rigid with said sleeve, a frictional element between said second and third disks, a hand wheel screw-threaded on said shaft beyond the outer end of said sleeve, a concavo-convex spring interposed between said sleeve and said wheel with its peripheral edge in contact with said wheel and having radial slots in the marginal portion thereof, and a handle mounted on said shaft outwardly beyond said sleeve to impart both rotary and axial movement thereto.

7. In a fishing reel, a frame, a spool driving member rotatably mounted on said frame and held against axial movement with relation thereto, a shaft mounted on said frame in axial alinement with said driving member for both rotary movement and axial movement, a disk rigid with the inner end of said shaft, a second disk rotatably mounted on said shaft, extending radially beyond the first mentioned disk and having means controlled by the movement of said shaft for drivingly connecting the same with and disconnecting the same from said driving member, a friction element between said disks, a sleeve slidably mounted on said shaft and held against rotation with relation thereto, a third disk rigid with said sleeve, a friction element between said second and third disks, a hand wheel screw-threaded on said shaft beyond the outer end of said sleeve, a concavo-convex spring interposed between said sleeve and said wheel with its peripheral edge in contact with said wheel and having radial slots in the marginal portion thereof, a handle mounted on said shaft outwardly beyond said sleeve to impart both rotary and axial movement thereto, said third disk being provided with ratchet teeth, a pawl on said frame to engage said ratchet teeth and prevent the rotation of said shaft in one direction, and means operable from the exterior of said frame for moving said pawl to an inoperative position.

LEE A. McDONALD.

REFERENCES CITED

The following references are of record in the file of this patent:

UNITED STATES PATENTS

| Number | Name | Date |
| --- | --- | --- |
| 318,190 | Kopf | May 19, 1885 |
| 715,076 | Horton | Dec. 2, 1902 |
| 953,479 | Mason | Mar. 29, 1910 |
| 1,554,786 | Case | Sept. 22, 1925 |
| 1,765,903 | Case | June 24, 1930 |
| 1,836,755 | Hirsch | Dec. 15, 1931 |
| 2,055,451 | Case | Sept. 22, 1936 |
| 2,316,314 | Burdick | Apr. 13, 1943 |